March 22, 1949.  J. W. LEIGHTON  2,464,982
STEERING LINKAGE
Filed Aug. 23, 1945  2 Sheets-Sheet 1
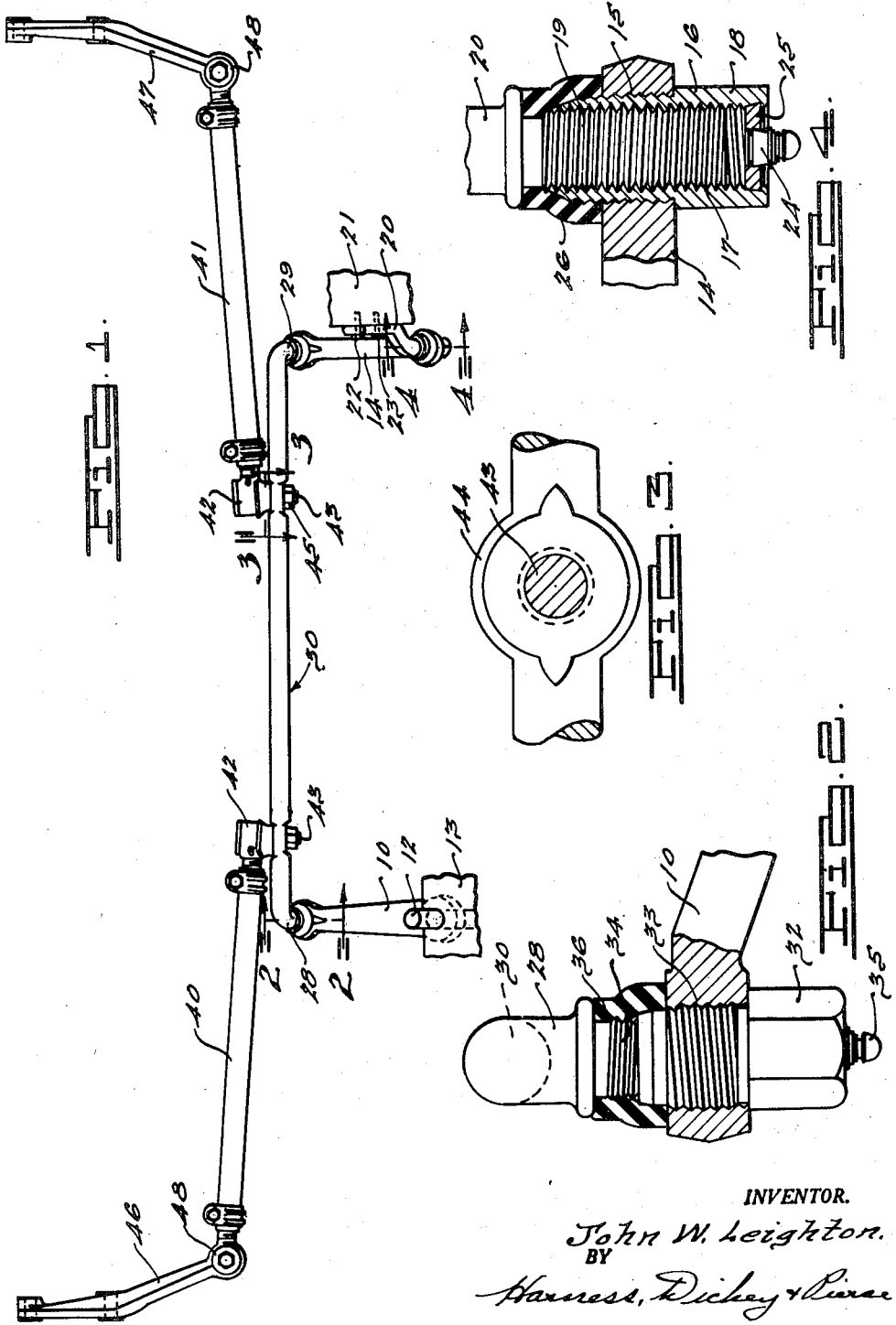
INVENTOR.
John W. Leighton
BY
Harness, Dickey & Pierce
ATTORNEYS.

March 22, 1949.  J. W. LEIGHTON  2,464,982
STEERING LINKAGE
Filed Aug. 23, 1945  2 Sheets-Sheet 2
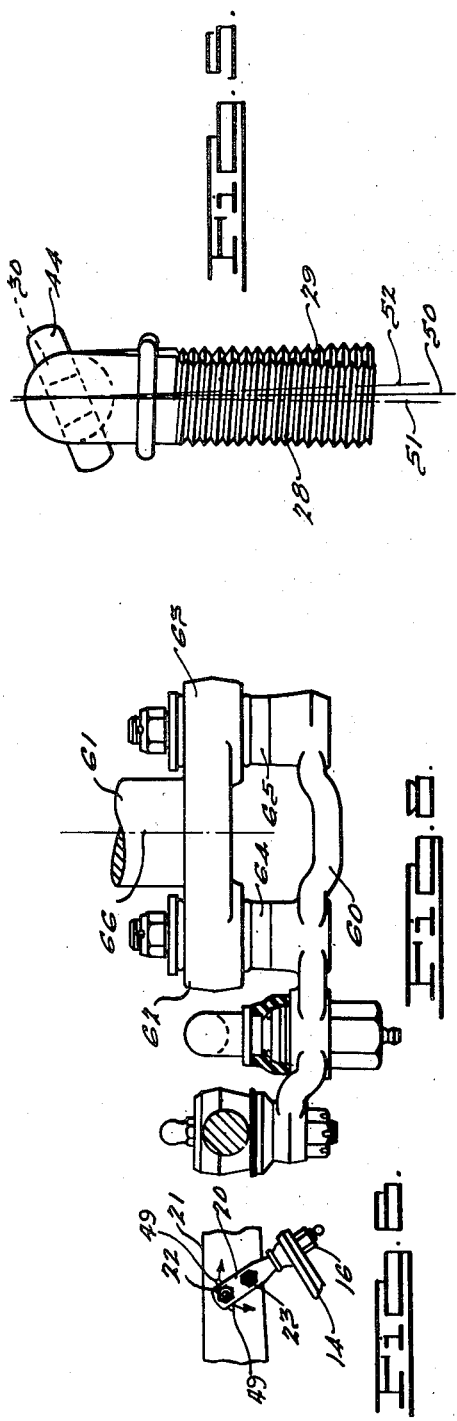
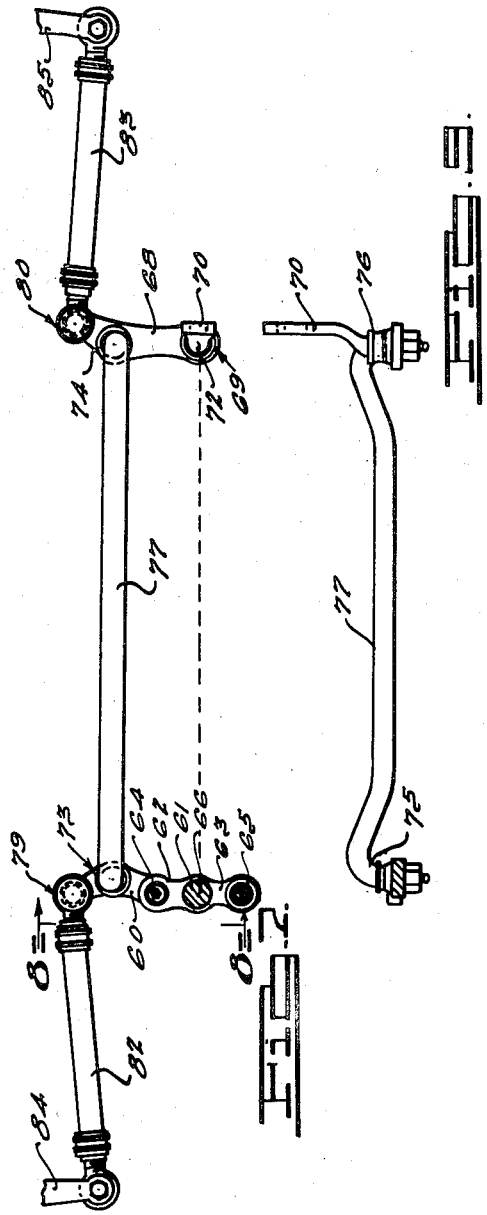
INVENTOR.
John W. Leighton.
BY
Harness, Dickey & Pierce
ATTORNEYS.

Patented Mar. 22, 1949

2,464,982

UNITED STATES PATENT OFFICE 2,464,982

STEERING LINKAGE

John W. Leighton, Port Huron, Mich.

Application August 23, 1945, Serial No. 612,166

7 Claims. (Cl. 280—95)

The invention relates generally to motor vehicles and it has particular relation to a steering linkage or steering gear.

One object of the invention is to provide an improved steering gear for motor vehicles wherein an improved link arrangement having cylindrical bearings is employed.

Another object of the invention is to provide an improved steering linkage of this character which will operate smoothly and noiselessly over a long period of time while still maintaining the links in their proper relative positions.

Another object of the invention is to provide an improved steering gear for motor vehicles wherein an improved link arrangement having threaded bearings is employed.

Another object of the invention is to provide an improved form of steering gear having a swingable arm on the steering post and an idler arm swingable in parallel relation thereto, wherein the two arms are connected pivotally together by threaded bearing connections.

Other objects of the invention will become apparent from the following specification, from the drawings relating thereto, and from the claims hereinafter set forth.

For a better understanding of the invention, reference may be had to the drawings wherein:

Figure 1 is a plan view of a steering gear constructed according to one form of the invention;

Fig. 2 is a cross-sectional view on a larger scale taken substantially along the line 2—2 of Fig. 1;

Fig. 3 is a cross-sectional view on a larger scale taken substantially along the line 3—3 of Fig. 1;

Fig. 4 is a cross-sectional view on a larger scale taken substantially along the line 4—4 of Fig. 1;

Fig. 5 is an end view of the connecting U-bolt showing the manner in which the threaded ends of the bolt initially are offset from each other;

Figure 6 is a side view of one of the link mountings shown by Figure 1;

Fig. 7 is a view similar to Fig. 1 illustrating another form of the invention;

Fig. 8 is a side view as seen substantially along the line 8—8 of Fig. 7; and,

Fig. 9 is a fragmentary rear view showing the U-bolt seen in Fig. 7.

Referring to Fig. 1, the steering gear comprises an arm 10 having an opening 11 at one end which is keyed or otherwise connected to a steering stub shaft 12 turnable by the steering column so that when the steering wheel is turned, the arm 10 also will turn. It is to be understood that the stub shaft 12 is turnably mounted on a part 13 of the vehicle frame in a suitable cylindrical bearing means. The arm 10 is normally located at the left side of the vehicle frame, and in the linkage shown, an idler arm 14 is provided at the opposite side of the frame. As best shown by Fig. 4, the idler arm has an opening 15 in which a bushing 16 is threaded, and this bushing in turn is internally threaded as indicated at 17. The threads in the openings 15 are of obtuse angle character and the lower end of the bushing has a hexagonal head 18 so that when the bushing is tightened in the opening 15, it will be locked against loosening.

The internal threads 17 in the bushing have pivotal threaded engagement with a trunnion portion 19 integral with the lower end of a bracket element 20 which is rigidly secured to a part 21 of the vehicle frame by bolts 22 and 23. For lubrication purposes a grease fitting 24 is fastened in a plug 25 in the lower end of the bushing and lubricant is prevented from escaping from the upper end of the bearing by means of a rubber sleeve element 26. In operation the arm 14 and trunnion 19 may turn or oscillate through the threaded bearing but the bushing will remain locked in the arm 14.

The forward ends of the two arms 10 and 14 are pivotally connected to the threaded legs 28 and 29, respectively, of a U-bolt 30 extending between them. Each of the pivotal connections is substantially the same as that shown by Fig. 4 and comprises a bushing 32, as seen in Fig. 2, which is threaded into an opening 33 in the arm. This bushing in turn is internally threaded and has pivotal threaded engagement with threads 34 on the leg of the bolt. Lubricant is supplied to the bearing by means of a grease fitting 35 on the lower end of the bushing, while it is prevented from escaping from the other end of the bushing by a rubber sleeve 36.

From this description it should be evident that the two arms 10 and 14 have their forward ends pivotally connected to the depending legs of the transversely extending U-bolt 30 and that such arms and bolt form a parallelogram with the frame as the fourth side. It also should be noted that with all four pivotal connections including the connection between the arm 10 and the vehicle frame through steering stub shaft 12 are effected through cylindrical type bearings whose axes are substantially parallel. Also it should be noted that three of these connections include threaded bearings.

The transversely extending part of the U-bolt 30 is connected to tie rods 40 and 41 and the inner end of each of these tie rods may be connected to the bolt by a conventional ball and socket joint indicated at 42, which includes a stud portion 43 extending through an enlarged portion 44 of the U-bolt. A nut 45 on the lower end of the stud 43 locks it rigidly to the U-bolt. Outer ends of the tie rods are in turn connected by ball and socket joints 48 to wheel mounting arms 46 and 47, respectively.

To avoid the necessity of manufacturing the bearings with close tolerances and the costly operations incident thereto, parts of the bearings are misaligned to utilize torsional spring or bending of the connecting members to eliminate play or rattle in the bearings. The elimination of play or rattle can be accomplished in several ways, either through manufacturing the bearings in misaligned relation or, for instance, by attaching the idler arm support 20 to the frame at such an angle as to accomplish this result. The means of eliminating looseness and rattle are particularly practical in threaded cylindrical bearings as compared to other types of bearings because a threaded bearing having lengthwise binding in its threads has advantages over other bearings similarly conditioned with lengthwise binding. This is true because the threads provide many bearing surfaces throughout the length of the bearing thus increasing the total bearing surface. Also the threads distribute and hold the lubricant better throughout the length of the bearing.

Attaching the support 20 to the frame to secure the result indicated above may be effected by changing the location of the bolt 22 to one or the other of openings 49 so as to slightly shift or swing the support about bolt 23 in the direction indicated by the arrow in Fig. 6.

According to Fig. 5, the legs 28 and 29 of the U-bolt 30 may be initially offset with respect to each other to secure tightness in the bearings. Relative to a center line 50 normal to the flat portions 44 of the U-bolt, and hence, in line with the studs 43, the axes of the threaded portions 28 and 29 may be offset axially at opposite sides of the center line as indicated at 51 and 52. When the U-bolt is assembled with the arms 10 and 14, the two threaded portions are brought into alignment or in other words, the axes 51 and 52 are brought into the plane of the center line 50, and this torsions the base or transverse portion of the U-bolt. The legs 28 and 29 might also be bent slightly apart lengthwise of the base of the bolt and in this case, the slight bending of parts of the bolt in assembling the bearings would provide the force constantly acting to tighten the bearings. Either of the arms 10 and 14 might be slightly bent to effect the misalignment of bearings mentioned or it may be preferable to attach the bracket 20 to the frame so as to effect the misalignment of bearings as previously stated.

In the form of the invention shown by Figs. 7 and 8, a different type of arm 60 is connected to the steering shaft indicated at 61, and in this instance the steering shaft has opposing projections 62 and 63, seen best in Fig. 7, which are connected to the arm 60 at points indicated at 64 and 65. When the steering shaft is turned in its bearing on the frame, it turns about its center 66 and hence, the arm 60 also swings about this center. The second arm forming the parallel linkage is indicated at 68 and this arm has a threaded bearing connection 69 with a bracket 70 adapted to be connected to the vehicle frame in the same manner as the bracket arm 20 previously described. It should be noted that the center line of the threaded bearing 69 as indicated at 72, corresponds in position to the center line 66, or in other words, these centers are substantially on the same transverse line.

The arms 60 and 68 are connected by threaded bearings 73 and 74 to legs 75 and 76 of a U-bolt 77 extending transversely in the frame. The arrangement described thus includes threaded bearings 69, 73 and 74 and arms 60, 68 and U-bolt 77 which substantially correspond in relation to the arrangement previously described, and the three threaded bearings may be maintained in tightened condition in substantially the same manner as previously described.

Instead of connecting the wheel links directly to the U-bolt in this case, the arms 60 and 68 extend beyond the bearings 73 and 74 and are connected by means of ball and socket joints 79 and 80 to opposing wheel links 82 and 83, respectively. These wheel links are in turn connected to wheel arms 84 and 85.

Although more than one form of the invention has been illustrated and described in detail, it will be apparent to those skilled in the art that various modifications may be made without departing from the scope of the claims.

What is claimed is:

1. A steering linkage adapted for use on a vehicle frame having a turnable steering shaft, comprising a pair of generaly parallel arms adapted to be disposed in laterally spaced relation on the frame, means for connecting one arm to the shaft so that it turns therewith, means for swingably mounting the other arm on the frame and comprising generally cylindrical bearing means extending substantially parallel to the turning axis of said one arm, a link extending between the arms, cylindrical bearing means connecting the link to each arm, all of said bearing means having their axes substantially parallel, and means constantly acting to throw the axes of the cylindrical bearings out of their substantially parallel relation so as to eliminate looseness in the bearings.

2. A steering linkage adapted for use on a vehicle frame having a turnable steering shaft, comprising a pair of generally parallel arms adapted to be disposed in laterally spaced relation on the frame, means for connecting one arm to the shaft so that it turns therewith, means for swingably mounting the other arm on the frame and comprising a threaded bearing extending substantially parallel to the turning axis of said one arm, a link extending between the arms, threaded bearing means connecting the link to each arm, all of said threaded bearing means having their axes substantially parallel, and means constantly acting to throw the axes of the threaded bearings out of their substantially parallel relation so as to eliminate looseness in the bearings.

3. A steering linkage adapted for use on a vehicle frame having a turnable steering shaft, comprising a pair of generally parallel arms adapted to be disposed in laterally spaced relation on the frame, means for connecting one arm to the shaft so that it turns therewith, means for swingably mounting the other arm on the frame and comprising generally cylindrical bearing means extending substantially parallel to the turning axis of said one arm, a link extending between the arms having the opposite end portions thereof extending substantially normal to the longitudinal axis of said link, and cylindrical bearing means connecting the link end portions to each arm, all of said bearing means having their axes substantially parallel.

4. A steering linkage comprising a pair of arms adapted to be swingably mounted in substantially parallel laterally spaced relation on a vehicle frame, means for swingably mounting said arms on said frame, said means including a threaded bearing, a connecting U-bolt having its legs threaded and journalled in threaded openings in the arms respectively, said U-bolt legs and said arm mounting means all having their axes substantially parallel, and link means for operatively connecting the linkage to the wheels to be steered, the bearings being maintained in a tight condition through torsion in the bolt.

5. In combination with a wheel frame having a turnable steering post, a steering linkage comprising a pair of generally parallel arms disposed laterally of the frame, means connecting one arm to a steering shaft, means swingably mounting the second arm on the frame and comprising a threaded bearing, a U-bolt connecting the arms and having its legs journalled in threaded openings in the arms respectively, said U-bolt legs, said steering shaft and said second arm mounting means all having their axes substantially parallel, the bolt being torsioned about its longitudinal axis and the threaded openings in the second arm being relatively angled so that the threaded bearings will be maintained in tight condition through torsion in the bolt and arm.

6. An article of manufacture for use in a steering linkage or the like comprising a U-bolt having its legs threaded to provide threaded bearings, the base portion of the bolt having enlarged portions for attaching links to the wheels to be steered, said enlarged portions comprising widened sections having apertures therein for receiving attaching bolt means.

7. An article of manufacture for use in a steering linkage comprising a connecting link having a base portion and cylindrical bearing portions disposed in substantially parallel relation to each other on the base portion, said base portion having spaced enlarged portions for attaching links to the vehicle wheels to be steered and extending angularly with respect to said base portion and said cylindrical bearing portions.

JOHN W. LEIGHTON.

REFERENCES CITED

The following references are of record in the file of this patent:

UNITED STATES PATENTS

| Number | Name | Date |
|---|---|---|
| 1,183,600 | Stahl | May 16, 1916 |
| 1,919,670 | Roos | July 25, 1933 |
| 1,994,582 | Leighton | Mar. 19, 1935 |
| 2,039,671 | Wagner | May 5, 1936 |
| 2,095,566 | Lundelius et al. | Oct. 12, 1937 |
| 2,123,087 | Leighton | July 5, 1938 |
| 2,144,162 | Leighton | Jan. 17, 1939 |
| 2,146,149 | Leighton | Feb. 7, 1939 |
| 2,152,506 | Thorne | Mar. 28, 1939 |
| 2,153,862 | Cowles | Apr. 11, 1939 |
| 2,193,137 | Leighton | Mar. 12, 1940 |
| 2,251,936 | Heftler | Aug. 12, 1941 |